United States Patent
Förtsch et al.

(10) Patent No.: US 7,304,559 B2
(45) Date of Patent: Dec. 4, 2007

(54) ROTARY TRANSFORMER FOR TRANSMISSION OF ELECTRICAL ENERGY OR INFORMATION

(75) Inventors: Ralf Förtsch, Freising (DE); Werner Mühleisen, München (DE); Roland Hölzl, München (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 11/538,564

(22) Filed: Oct. 4, 2006

(65) Prior Publication Data
US 2007/0080770 A1   Apr. 12, 2007

(30) Foreign Application Priority Data
Oct. 4, 2005   (DE) ........................ 10 2005 047 525
Dec. 5, 2005   (DE) ........................ 10 2005 058 104

(51) Int. Cl.
*H01F 27/24*   (2006.01)
(52) U.S. Cl. ........................................ 336/234; 310/217
(58) Field of Classification Search ................ 336/65, 336/83, 115–119, 130–132, 212, 234; 310/154.41, 310/216–217
See application file for complete search history.

(56) References Cited

U.S. PATENT DOCUMENTS

| | | | |
|---|---|---|---|
| 5,272,350 A | 12/1993 | Solari et al. | |
| 5,572,178 A * | 11/1996 | Becker et al. | 336/120 |
| 6,876,120 B2 * | 4/2005 | Miya et al. | 310/216 |
| 6,897,756 B2 | 5/2005 | Haisch | |

FOREIGN PATENT DOCUMENTS

JP           09213549 A   *   8/1997

* cited by examiner

*Primary Examiner*—Tuyen T. Nguyen
(74) *Attorney, Agent, or Firm*—David S. Safran

(57) ABSTRACT

A device for efficient transmission of electrical energy and/or information is built in the manner of a rotary transformer. The cores of this device are made of ferromagnetic rings of a U-shaped cross section of soft iron, or of soft iron core stacks of annular or hollow cylindrical shape, the ring-shaped or hollow cylindrical sheets typically being unslotted. There can be several coil sets within such a device; in this way several channels can be made available for parallel transmission of electrical energy and/or information.

4 Claims, 4 Drawing Sheets

DETAIL X

DETAIL Y

US 7,304,559 B2

ROTARY TRANSFORMER FOR TRANSMISSION OF ELECTRICAL ENERGY OR INFORMATION

BACKGROUND OF THE INVENTION

1. Field of the Invention

This invention relates to a rotary transformer for simultaneous and/or selective transmission of electrical energy or information.

Furthermore, the invention relates to a process for simultaneous and/or selective transmission of electrical energy or information by means of such a rotary transformer.

2. Description of Related Art

A rotary transformer of the type to which the invention is directed, hereinafter simply called a transformer, is known from German Patent DE 102 34 893 and corresponding U.S. Pat. No. 6,897,756. This transformer is designed to be used especially in circular knitting machines. Another transformer of this type is known from U.S. Pat. No. 5,272,350 and is preferably used in conjunction with oil drilling systems. Other transformers of this type have been used for a long time in conjunction with nondestructive testing systems (NDT systems).

All of these systems emphasize efficient transmission of energy and/or information. For this reason, typically, a ferrite material is used as the magnet material for the transformer cores. In any case, the use of ferrite material for NDT systems has proven problematic, among other reasons, due to the conditions of use in a severe industrial environment.

SUMMARY OF THE INVENTION

Therefore, a primary object of the invention is to provide a powerful, even multi-channel transformer for electrical energy and/or information which is better suited to use in NDT systems than are conventional transformers based on ferrite core material.

This object is achieved by a transformer arrangement as described below.

The invention calls for abandoning ferrite material and using transformer cores based on steel or transformer iron in an unconventional arrangement and geometrical configuration. In particular, in accordance with the invention, an arrangement of ferromagnetic rings which are layered on one another and which are, optionally, insulated from one another are provided as a core or core half for a transformer, or an arrangement of hollow ferromagnetic cylinders, optionally, insulated from one another and inserted into one another are provided as a core for a transformer. The indicated rings and cores are preferably unslotted in order to prevent variations of the magnetic resistance of these transformers which are dependent on the angle of rotation; this greatly improves information transmission. The so-called figure axis of these rings or hollow cylinders should coincide with the figure axis of the respective primary and secondary coils. This arrangement with unslotted rings or hollow cylinders is normally not used due to the following consideration: based on the coaxial arrangement of the primary and secondary coils and the unslotted rings or hollow cylinders, the occurrence of unwanted and efficiency-reducing secondary currents in these arrangements can be avoided. However, according to the invention, this arrangement surprisingly produces only acceptable to low energy loss and has major advantages in other properties. The invention is thus much more advantageous than known arrangements and approaches, viewed overall.

In addition to the preferred configuration of the invention with unslotted rings and hollow cylinders, there is another configuration which provides for slotted rings or hollow cylinders, the respective slots running essentially in the radial direction of the corresponding figure axes. Moreover, there is a configuration in which the indicated rings or hollow cylinders are composed of a host of ferromagnetic transformer core parts which are arranged side-by-side.

The invention is described below with reference to the accompanying drawings.

DETAILED DESCRIPTION OF THE INVENTION

Figure 1:
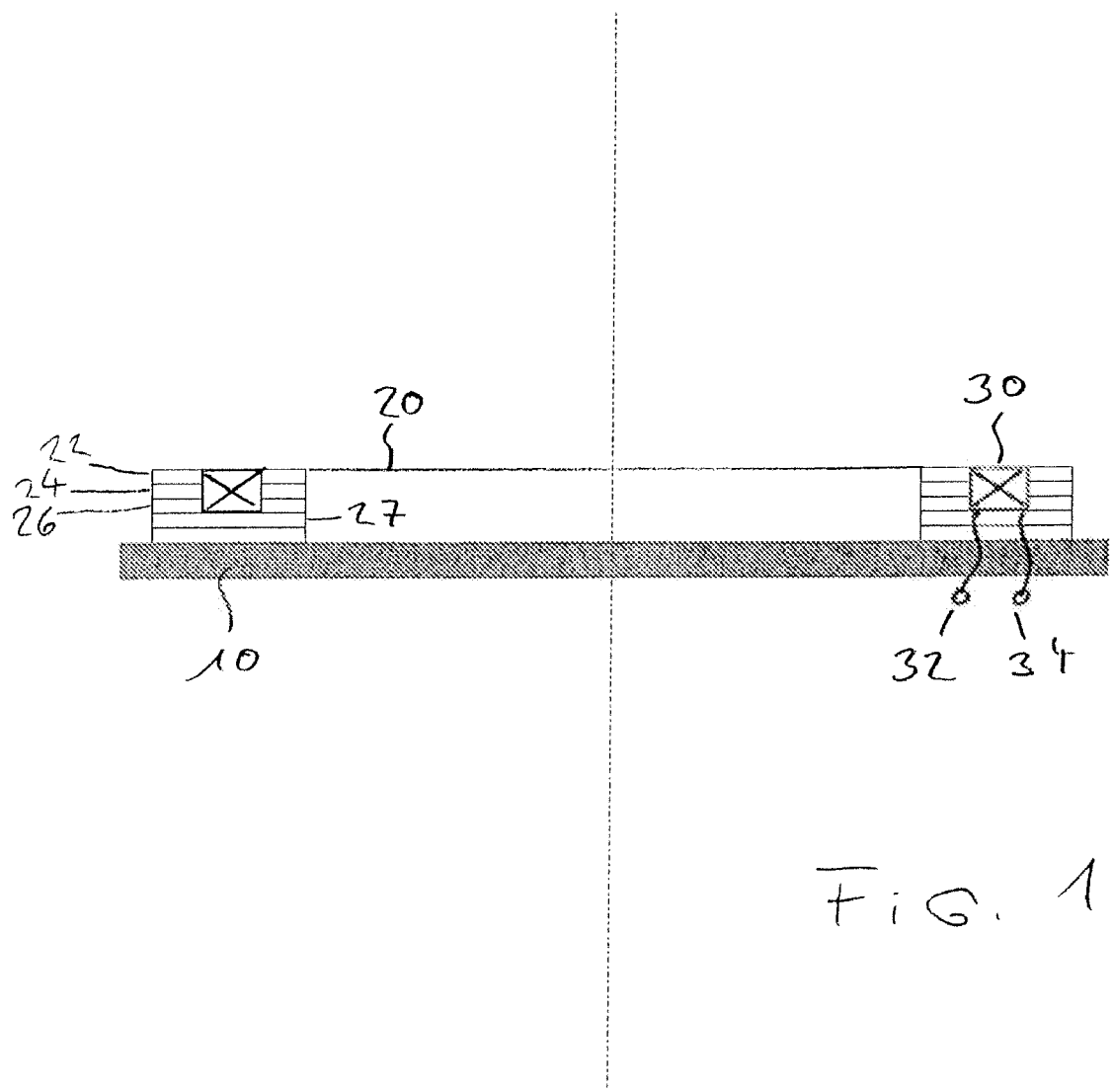
FIG. 1 is a schematic cross section through the first half of a transformer formed of a carrier, core and coil.

As is shown in FIG. 1, the first half of a transformer in accordance with the invention is formed of, for example, a nonmagnetic or nonmetallic plate-shaped base 10 and a ferromagnetic core 20 which is comprised of a set of core laminations 22, 24, 26, 27 etc. of circular annular shape. The core laminations are not made of ferrite, but of steel sheet, preferably of so-called transformer magnetic steel sheet, or another solid soft iron material. The number of core laminations shown in FIG. 1 are presented simply as an example, far more core laminations can be used, or also far less. To hold a coil 30 of relatively large diameter to length ratio, and with a relatively large inside diameter, the core laminations 22, 24, and 26 etc. are each formed of an outer (circular) ring and a radially inner (circular) ring. The coil 30 is electrically insulated with respect to the core 20. The connections 32, 34 of the coil 30 can, as shown, be routed to the outside through holes (36, 37, FIG. 3) within the core 20 and the base 10.

Figure 2:
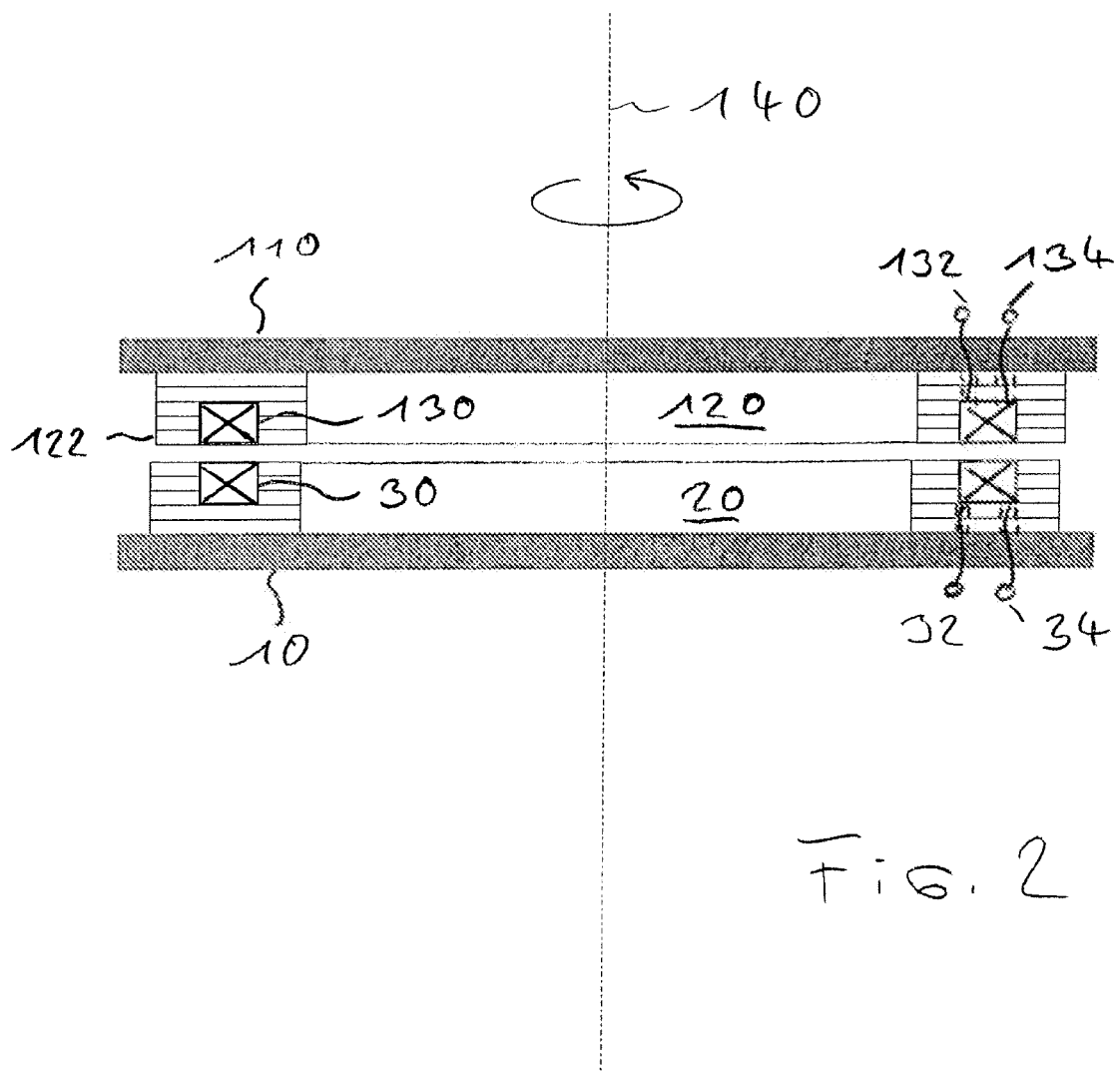
FIG. 2 is a schematic cross section through an arrangement of a first and a second half of a transformer.

As shown in FIG. 2, a complete transformer is comprised of a first, stationary half 10 and a half which can be rotated relative to it. The rotatable half is formed of a base 110 and core 120 with core laminations 122, etc. and a coil 130. The rotation of the half 110 occurs about axis 140. The axes of the halves 10 and 110 are preferably parallel, and in the ideal case, coincide. The first and the second half are preferably made to be entirely comparable. The air gap between the cores 20, 120 is dimensioned according to practical circumstances and is typically relatively small. Inductive coupling between the first and second coils 30, 130 is therefore accomplished essentially by the magnetic flux in the cores 20, 120 which surrounds the coils toroidally in the known manner. In this way, an AC voltage transmission of information or electrical energy without contact from, for example, the connections 32, 34 to the connections 132, 134, can be obtained; in other words, a voltage can be tapped or read at the connections 132, 134.

Figure 3:
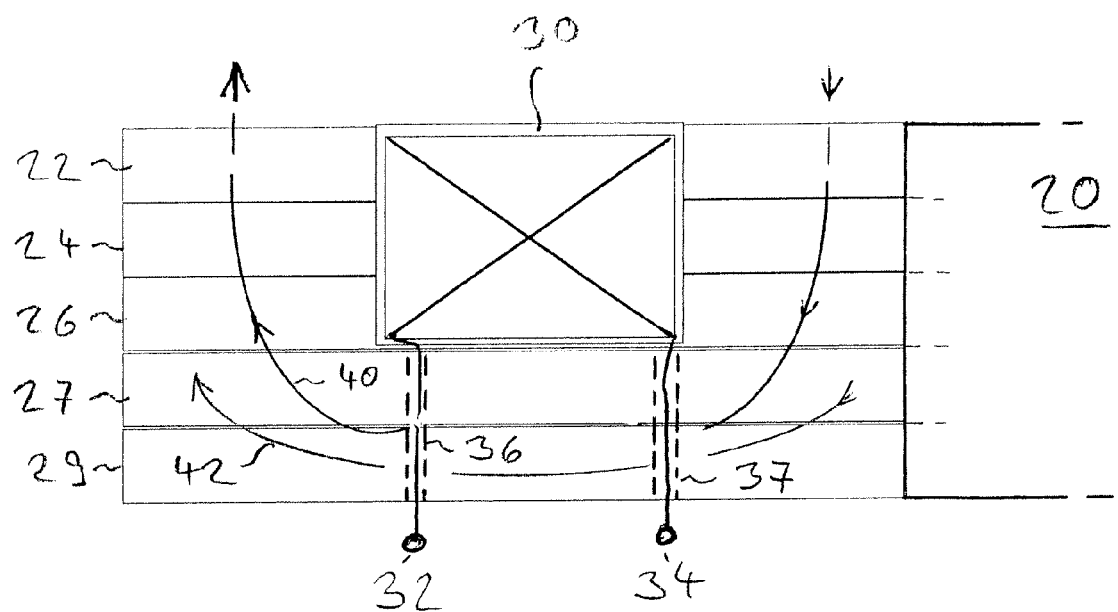
FIG. 3 shows a detail from FIG. 1.

The magnetic flux runs through the core 20, with the coil 30 energized, as shown schematically in FIG. 3. As shown, the magnetic field lines in the soft magnetic sheets 27, 29 run generally parallel to their surfaces so that induction of secondary voltages can only occur to a small degree in these sheets.

Figure 4A:
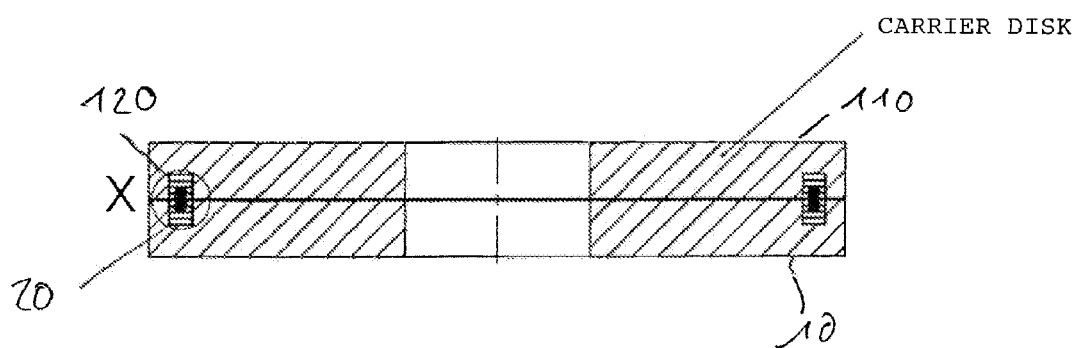
FIG. 4A is an enlarged view of Detail X of FIG. 4.
Figure 4:
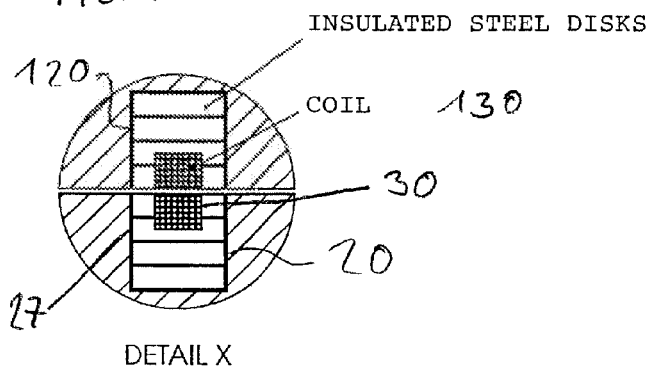
FIG. 4 is a cross section through a similar transformer arrangement with horizontally layered, annular core laminations
Figure 5:
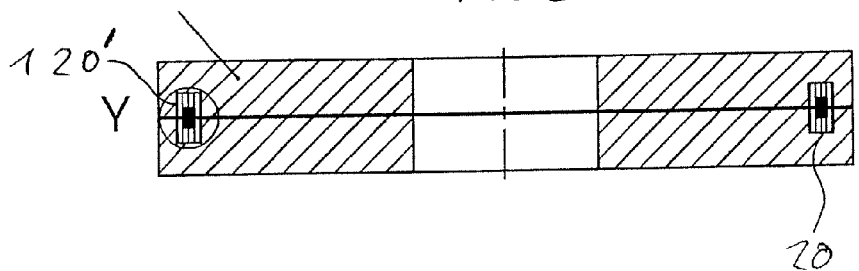
FIG. 5 is a cross section through a similar transformer arrangement with vertically layered core laminations with a hollow cylindrical shape and FIG. 5A is an enlarged view of Detail Y of FIG. 5.

The arrangement of the device in accordance with the invention, as shown in FIG. 4, in principle, is comparable to the arrangement as shown in FIG. 2, but has modified carriers 10, 110 of a hollow cylindrical shape (connections to coils 30, 130 are not shown in FIGS. 4 & 5). As shown in detail X in FIG. 4A, the coils 30, 130 are held by insulated steel disks or rings disposed in the annular hollow of the carriers.

Figure 5A:
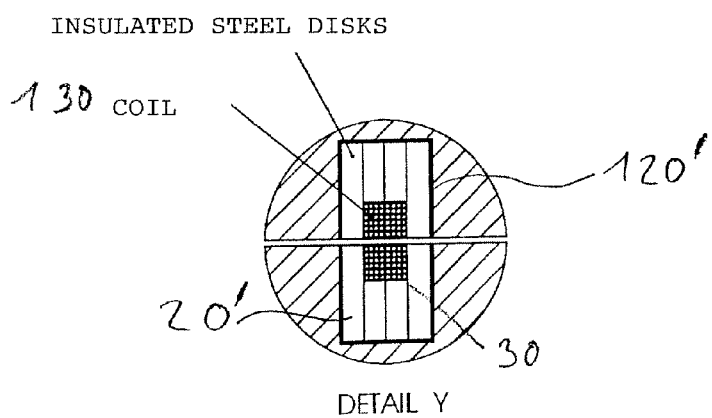

The arrangement as shown in FIG. 5 corresponds essentially to the arrangement in FIG. 4, but instead of insulated steel disks or rings, now insulated steel strips (soft iron strips) of hollow cylindrical shape are provided for the cores 20', 120', as is clearly shown in detail Y of FIG. 5A.

In another embodiment of the invention, even instead of steel disks or steel strips for the cores 20, 20', 120, 120' also those of solid soft iron are provided and are preferably equipped with a groove for holding the coils. It is surprising that the disadvantage of construction-induced eddy current losses is far less serious than the advantages of a comparatively simple and economical manner of production of these soft magnetic cores of solid metallic material, compared to known devices with ferrite cores or other sintered material.

The latter embodiment of the invention is therefore characterized in that there is a first stationary ferromagnetic core formed of ferromagnetic, annular, soft iron solid material that is unslotted in the radial direction, and which is provided with a groove which faces in the axial direction, there is a second core which is arranged to be able to turn around an axis (140) relative to the first core (20) and which is made of ferromagnetic, annular, soft iron solid material that is unslotted in the radial direction and which is provided with a groove that faces in the axial direction, and there are a first coil (30) which can be energized by means of connections (32, 34) and a second coil (130) which can be energized or read by means of connections (132, 134).

In accordance with the invention, it is advantageous to provide not only one opposing pair of coils in the cores 20, 120, but a plurality of these coil pairs which are staggered in the radial direction. In this arrangement energy or information transmission occurs essentially only between those coils which are directly opposite one another. Transmission of varied digital data in addition to varied power transmission is very easily possible in this way.

What is claimed is:

1. Device for transmission of electrical energy or information, comprising:
   a stationary ferromagnetic first core formed of ferromagnetic, unslotted and layered core laminations and having a front face with a recess of cylindrical shape;
   a second core located which is rotatable around an axis relative to the first core and that is formed of ferromagnetic, unslotted and layered core laminations and has a front face with a recess of cylindrical shape;
   a first coil having connections by which the coil can be energized and disposed in the recess of the first core; and
   a second coil having connections with which it can be energized or interrogated and disposed in the recess of the second core,
   wherein the cores are closely spaced with their front faces disposed opposite each other.

2. Device for transmission of electrical energy or information in accordance with claim 1, wherein the core laminations are layered in sets and are either of circular annular or hollow cylindrical shape.

3. Device in accordance with claim 2, wherein the core laminations are layered in sets and are insulated relative to each other by an electrical insulation material.

4. Device for transmission of electrical energy or information, comprising:
   a stationary ferromagnetic first core formed of ferromagnetic, annular, soft iron solid material which is unslotted in a radial direction and which is provided with an annular groove which faces in an axial direction;
   a second core which is rotatable around an axis relative to the first core and is made of ferromagnetic, annular, soft iron solid material which is unslotted in the radial direction and which is provided with an annular groove which faces in the axial direction;
   a first coil having connections by which the coil can be energized and which is disposed in the groove of the first core; and
   a second coil having connections with which it can be energized or interrogated and which is disposed in the groove of the second core.

* * * * *